No. 780,704. PATENTED JAN. 24, 1905.
N. D. CHARD.
GEARING FOR HEAD STOCKS FOR LATHES.
APPLICATION FILED JUNE 17, 1904.

2 SHEETS—SHEET 1.

Witnesses
Oliver B. Kaiser
Leo O'Donnell

Inventor
Nicholas D. Chard
By Wood & Wood
Attorneys

No. 780,704. PATENTED JAN. 24, 1905.
N. D. CHARD.
GEARING FOR HEAD STOCKS FOR LATHES.
APPLICATION FILED JUNE 17, 1904.
2 SHEETS—SHEET 2.
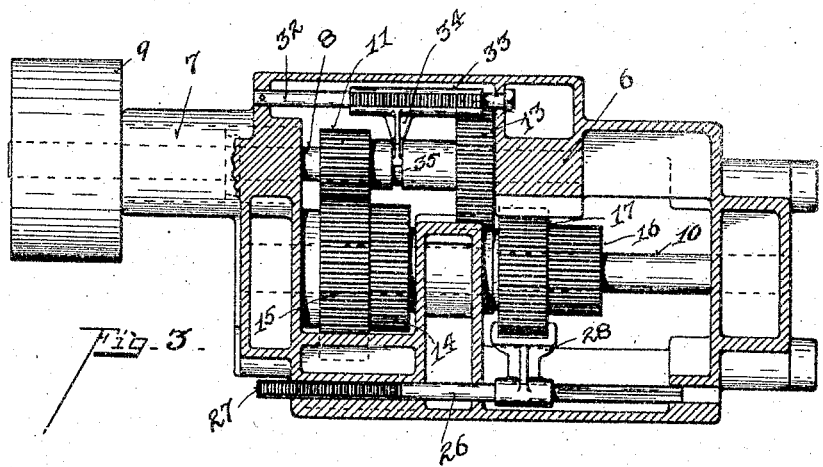
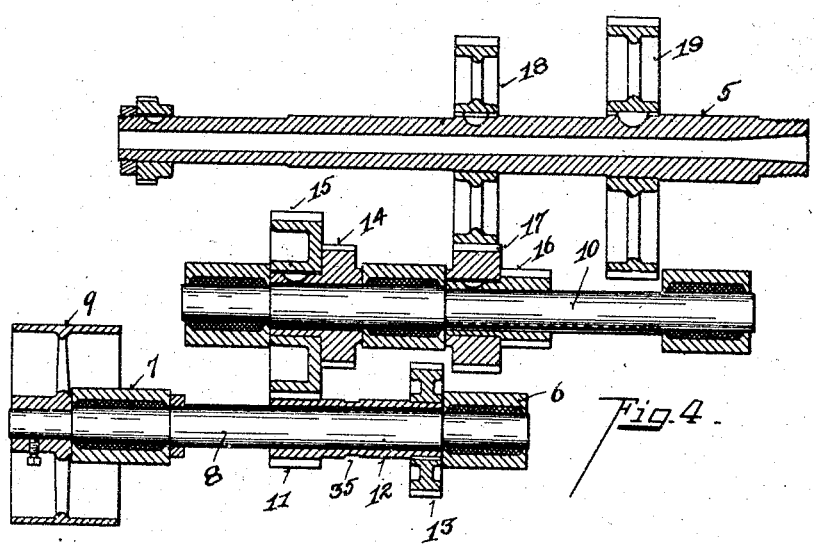
Witnesses
Oliver B. Kaiser
Leo O'Donnell
Inventor
Nicholas D. Chard
By
Attorneys No. 780,704.

Patented January 24, 1905.

UNITED STATES PATENT OFFICE.

NICHOLAS D. CHARD, OF CINCINNATI, OHIO, ASSIGNOR TO THE LODGE & SHIPLEY MACHINE TOOL COMPANY, OF CINCINNATI, OHIO, A CORPORATION.

GEARING FOR HEAD-STOCKS FOR LATHES.

SPECIFICATION forming part of Letters Patent No. 780,704, dated January 24, 1905.

Application filed June 17, 1904. Serial No. 213,031.

*To all whom it may concern:*

Be it known that I, NICHOLAS D. CHARD, a citizen of the United States, residing at Cincinnati, in the county of Hamilton and State of Ohio, have invented certain new and useful Improvements in Gearing for Head-Stocks of Engine-Lathes, of which the following is a specification.

My invention relates to a variable-speed gearing for the head-stock for lathes.

One of the objects of my invention is to provide means whereby a powerful varied back gear-drive may be imparted to the spindle.

Another object of my invention is to control said variable speeds by a single lever.

Another object of my invention is to provide means where the change-gearing is controlled by one lever in such manner that only one change can be made at a time, the gears not in commission being stationary.

The features of my invention are more fully set forth in the description of the accompanying drawings, forming a part of this specification, in which—

Figure 1:
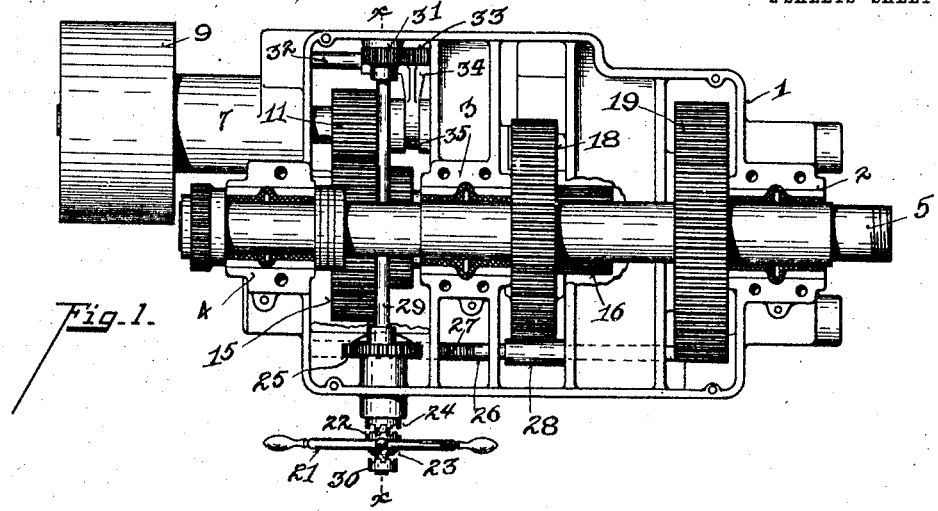
Figure 2:
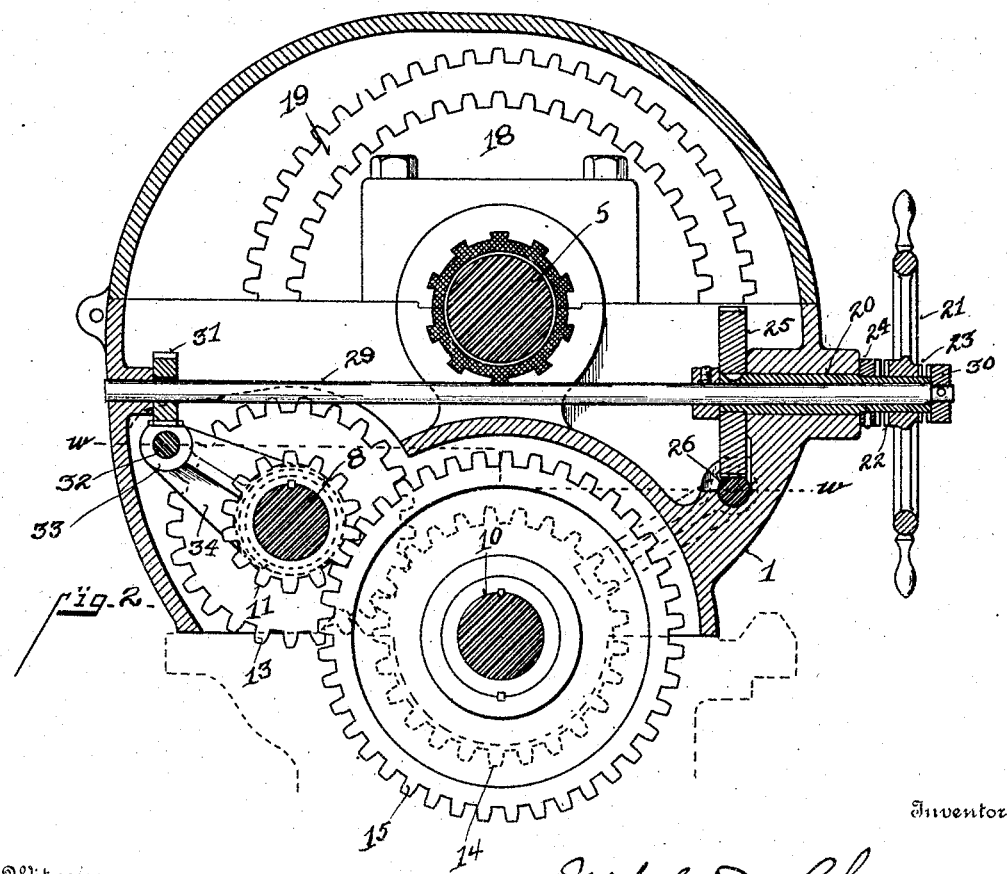

Figure 1 is a top plan view with the cover-plate removed. Fig. 2 is an enlarged section on line *x x*, Fig. 1. Fig. 3 is a section on line *w w*, Fig. 2. Fig. 4 is a diagrammatical view of the gearing arrangement.

1 represents the head-stock provided with bearings 2, 3, and 4, in which the spindle 5 is journaled.

6 7 represent journal-bearings cast integral with the head-stock 1, at one side thereof, and in which the main driving-shaft 8 is journaled.

9 represents a pulley fixed to shaft 8 for driving the same.

10 represents an intermediate shaft journaled in suitable bearings in the casing 1. (See Fig. 4.)

Upon shaft 8 is slidably mounted a gear 11, provided with an elongated sleeve 12.

13 represents a gear fixed to the sleeve 12 and gear 11.

Upon the intermediate shaft 10 is fixed a gear 14, provided with a sleeve to which is fixed a gear 15, said gear-wheels 11 and 13 being adapted to be alternately engaged with gears 15 and 14, respectively, for transmitting a varied speed to shaft 10. The means for shifting gears 11 and 12 will be hereinafter described.

16 represents a gear splined on shaft 10 and adapted to be slid thereon, said gear-wheel 16 being provided with a sleeve to which is fixed a gear 17. Upon the spindle 5 are fixed gears 18 and 19, adapted to be respectively engaged with gears 17 and 16 for transmitting motion to the spindle 5.

In order to effectively shift gears 11 and 13 on shaft 8 alternately into engagement with gears 15 and 14 on shaft 10 and gears 17 and 16 on shaft 10 alternately into engagement with gears 18 and 19, spindle 5, (see Fig. 4,) the following mechanism is provided: 20 represents a sleeve journaled in the side frame of the head-stock 1. (See Fig. 2.) 21 represents a hand-wheel being provided with clutch members 22 and 23 on each side of its hub and journaled upon the sleeve 20. 24 represents a clutch member fixed to the sleeve 20. Thus as the clutch members 22 and 24 are engaged motion will be imparted to the sleeve 20. 25 represents a rack-gear fixed to the sleeve 20. 26 represents a rack-bar slidably supported in the head-stock, as shown in Fig. 3, the said rack-bar at one end being provided with teeth 27, with which the teeth of the rack-gear 25 engage. 28 represents a yoke-arm fixed to the rack-bar 26, the yoke of which engages gear 17 on shaft 10. Thus by manipulating the hand-wheel 21 with the clutch members 22 and 24 engaged the rack-bar 26 can be shifted to engage gear 17 with gear 18 or gear 16 with gear 19, as desired. By this means one set of gearing forming one speed-change is controlled. 29 represents a shaft journaled within the sleeve 20 at one end and in the casing of the head-stock at its opposite end. 30 represents a clutch member fixed to the shaft 29, adapted to be engaged by clutch member 23 of the hand-wheel 21. 31 represents a rack-gear fixed to the shaft 30. 32 represents a rod fixed in the casing of the head-stock. 33 represents a sleeve fitting said rod 32 and provided with rack-teeth projecting upwardly and adapted to mesh with the teeth of the rack-gear 31. 34 represents a yoke-arm cast integral with the sleeve 33, the yoke of which engages the groove 35 in the sleeve 12 of gear 11. Thus when the clutch member 23 of the hand-wheel 21 is engaged with the clutch member 30 shaft 29 can be journaled, imparting motion to the yoke-arm 34 for shifting gears 11 and 12, respectively, into engagement with gear 15 and 14 on shaft 10. By this arrangement four speeds are imparted to the lathe-spindle, as follows: The first speed being from shaft 8, gear 11 being in mesh with gear 15 through the said gear-wheels 11 and 15, shaft 10 to gear 17, gear 17 being engaged with gear 18, and through said gear 18 to the lathe-spindle 5. The second speed is obtained by shifting gears 16 and 17 to the right, bringing gear 16 into engagement with gear 19, the remaining gears on shafts 10 and 8 remaining in the same position as that of the first speed. The third speed is obtained by shifting gears 11 and 13 to the left, disengaging gear 11 from gear 15 and engaging gear 13 with gear 14. Thus the motion will be from shaft 8, through gears 13 and 14, shaft 10, gears 17 and 18, to the lathe-spindle 5. The fourth speed is obtained by shifting gear 16 into engagement with gear 19. Thus the motion will be from shaft 8, through gears 13 and 14, shaft 10, and gears 16 and 19, to the lathe-spindle 5.

Having described my invention, I claim—

1. In a variable-speed device, a casing, three shafts, different-diameter gear-wheels thereon, two of said gear-wheels being independently slidable on their shafts for bringing into mesh different trains of gears, a sleeve and concentric shaft journaled in the casing, and independently revoluble, transmitting devices between the sleeve and one sliding member, transmitting devices between said concentric shaft and the other sliding member, a handle common to said sleeve and concentric shaft adapted to be alternately fixed to either whereby the two sliding members may be shifted independently, substantially as described.

2. In a variable-speed device, a casing, three shafts, different-diameter gear-wheels thereon, two of said gear-wheels being independently slidable on their shafts for bringing into mesh different trains of gears, a sleeve and concentric shaft journaled in the casing, and independently revoluble, transmitting devices between the sleeve and one sliding member, transmitting devices between said concentric shaft and the other sliding member, the concentric shaft and sleeve having opposing clutch members, a hand-wheel provided with a double-faced clutch slidable between the clutch members first named and adapted to be alternately fixed to said concentric shaft or sleeve whereby the sliding members for changing speeds may be independently shifted, substantially as described.

3. In a variable-speed device, a casing, three shafts, eight gear-wheels thereon comprising two pairs of gear-wheels independently shiftable on their shaft to give four changes of speed, concentrically-journaled shaft and sleeve, transmitting devices between the concentric shaft and one of said pairs of sliding gears, independent transmitting devices between said sleeve and the other pair of sliding gears, said transmitting devices being adapted to shift said gear-wheels longitudinally on their shaft to bring into train different sets of gear-wheels, and an operating-handle adapted to be alternately fixed to said concentric shaft or sleeve whereby they may be independently rotated by said handle to effect the said four changes of speed, substantially as described.

4. In a variable-speed device, a casing, three shafts, there being on the first shaft a pair of different-diameter gear-wheels fixed to turn with and slide on said first shaft, there being fixed on said second shaft a pair of different-diameter gear-wheels adapted to be intermeshed with the sliding gears on the first shaft, there being on the said second shaft a second pair of different-diameter gear-wheels adapted to slide thereon and turn therewith, there being on the third shaft two gear-wheels of different diameter adapted to be intermeshed with the slidable gear-wheels on the second shaft, a concentric shaft and sleeve transversely journaled in the casing and independently revoluble, a rack for each slidable pair of gear-wheels, gears on the concentric shaft and sleeve meshing with said racks respectively, an operating-handle, and means for alternately fixing the same to the concentric shaft or sleeve, whereby they may be independently rotated to shift either pair of sliding gears in either direction, substantially as described.

5. In a variable-speed device, a casing, three shafts having eight gear-wheels of different diameter, there being two pairs of different-diameter gear-wheels independently slidable on their shaft to bring into operation four trains of gear-wheels, a concentric shaft and sleeve journaled in the casing, a rack for each sliding pair of gear-wheels, a gear-wheel on the concentric shaft engaging one rack, a gear-wheel on the sleeve engaging the other rack, an operating-handle, and means for alternately fixing the same to said concentric shaft or sleeve, whereby they may be independently rotated to shift either pair of sliding gears in either direction, substantially as described.

In testimony whereof I have hereunto set my hand.

NICHOLAS D. CHARD.

Witnesses:
OLIVER B. KAISER,
LEO O'DONNELL.